US007649465B1

(12) United States Patent
Vogel

(10) Patent No.: US 7,649,465 B1
(45) Date of Patent: Jan. 19, 2010

(54) TIE-LINE-ATTENDANT

(76) Inventor: Timothy J. Vogel, 220 Clark Rd., West Sunbury, PA (US) 16061

( * ) Notice: Subject to any disclaimer, the term of this patent is extended or adjusted under 35 U.S.C. 154(b) by 0 days.

(21) Appl. No.: 11/502,100

(22) Filed: Aug. 10, 2006

(51) Int. Cl.
*G08B 23/00* (2006.01)
(52) U.S. Cl. ............... 340/573.3; 340/573.1; 340/665; 340/668
(58) Field of Classification Search ............ 340/573.3, 340/665, 668, 573.1
See application file for complete search history.

(56) References Cited

U.S. PATENT DOCUMENTS

| 3,972,320 | A * | 8/1976 | Kalman ............... 600/519 |
| 7,127,370 | B2 * | 10/2006 | Kelly et al. ............ 702/151 |
| 7,151,444 | B1 * | 12/2006 | Doyle ............... 340/539.1 |
| 2001/0038330 | A1 * | 11/2001 | Garcia ............... 340/568.1 |
| 2005/0083207 | A1 * | 4/2005 | Smith et al. ............ 340/668 |
| 2007/0037567 | A1 * | 2/2007 | Ungless et al. ......... 455/422.1 |

\* cited by examiner

*Primary Examiner*—Daniel Wu
*Assistant Examiner*—Hongmin Fan

(57) ABSTRACT

The Tie-Line-Attendant ("TLA") identifies a distressed animal and alarms its owner for immediate assistance. The TLA Transmitter is connected between the tie line and the tether line. The owner sets the maximum time duration ("MTD") allowed for an animal to exert pressure on the tether line. When an animal exerts pressure on the tether line, the tether line and tie line will pull the TLA eyelets closing the normally open contacts. A timer will count the duration of the pressure. If the pressure is released before MTD is reached, the timer will reset itself automatically. Otherwise, the transmitter will sound an alarm and send a signal to the owner's receiver. The receiver will then alarm the owner that his animal needs immediate assistance.

The transmitter and the receiver contain: control switches, LED indicators, and an audible alarm.

1 Claim, 13 Drawing Sheets

SYSTEM DIAGRAM

TIE-LINE-ATTENDANT

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention generally relates to electronic safety devices, specifically to be utilized in the equestrian industry and related to but not limited to equine, or horse industry.

2. Prior Art

The problem that is intended to be solved is to protect and save the lives of many different horses that are required to be bound to the end of a tether line for extended periods of time.

As an example, in the equine industry, trail horses, pack horses, show horses, rental horses etc. are tied to a picket line, the side of a trailer, sides of buildings, etc. and sometimes, of necessity, left unattended for extended periods of time. Horses, by nature, eat from the ground and will accidentally step through or across the tether line that extends from the attachment to the horses head or body, thus entangling the horse in a very dangerous situation. As a horse realizes it is tangled, it will, in many cases, panic and begin attempting to pull free. This attempt will usually have an adverse effect to the horse involved. The tether line will tighten either around the horses' leg, neck, nose or body causing serious rope burns or lacerations, fractured bones or even suffocation. In the event the horse survives and does not suffocate itself, euthenization still may be necessary if the incident results in serious injury.

All prior inventions have been to prevent a horse from becoming entangled while the owner is away. A "Break Away halter" and "clips" currently exist on the market. The "Break Away halter" is designed to break if the horse exerts too much stress or pressure very quickly. The "clip" or "snap" would release the horse if the horse exerts too much pressure. With both products, the owner would not be aware the horse is freed and other hazards now exist.

Our concept is different in that it is designed to save or rescue a horse after it has become entangled while the owner is away. The Tie-Line-Attendant ("TLA") will identify a horse in distress by measuring the duration of time when pressure is applied to the device. Once the preset condition is met, the TLA will sound an alarm to alert those nearby the horse that it needs immediate attention, and send a signal to a portable receiver to alert the owner that his horse needs immediate assistance.

The main focus of prior inventions is to keep a horse from becoming entangled. Since we are dealing with creatures that are unable to reason and do not understand the consequences of their actions, we must look further to save their lives after entanglement has occurred.

The Tie-Line-Attendant can be used by itself or with other preventative devices to increase the security of the horse's well being.

OBJECTS AND ADVANTAGES

Accordingly, several objects and advantages of my invention are:

(a) To provide a safety device that identifies a horse in distress by measuring the time when pressure is applied to the device by the horse and comparing them to the preset conditions.

(b) To provide a safety device that when preset conditions are met would sound and audible alarm at the transmitter (base unit) to alert one or more persons nearby that the horse requires immediate attention. The transmitter will send a signal to a portable receiver which will sound an alarm alerting the owner that his horse needs immediate attention.

(e) To provide a safety device that is adjustable to various types of horses, which are required to be tied for a period of time.

(h) To provide a safety device that is waterproof, rigid and substantial so that it is able to handle the destructive nature of horses.

(i) To provide a safety device that could be used in conjunction with other preventative devices to increase the security of a horse.

The Tie-Line-Attendant will enable the owner to perform other duties away from the horse, with the peace of mind that he would be alerted if emergency arises due to entanglement. Further objects and advantages of my invention will become apparent from a consideration of the drawings and ensuing description.

SUMMARY

Prior attempts to solutions have been to prevent a horse from entanglement. The Tie-Line-Attendant is entirely different in function and concept. Our approach is to engage in alarming one or more persons in the event of entanglement. Our device could actually be used in conjunction with other devices that have been designed to avoid entanglement. In the event of an entanglement and all devices fail, our alarm will be the final protection for the horse

DRAWINGS

Figures

DRAWINGS

Reference Numerals

| 1  | eyelets                | 2  | nuts               |
|----|------------------------|----|--------------------|
| 3  | housing                | 4  | springs            |
| 5  | contacts               | 6  | power source       |
| 7  | transmitter            | 8  | audible alarm      |
| 9  | on/off switch          | 10 | microprocessor     |
| 11 | LED indicators         | 12 | code select switch |
| 13 | time delay             | 14 | tie line           |
| 15 | Tie-Line-Attendant (TLA) | 16 | tether line      |
| 17 | animal                 |    |                    |

DETAIL DESCRIPTION

Figure 1:
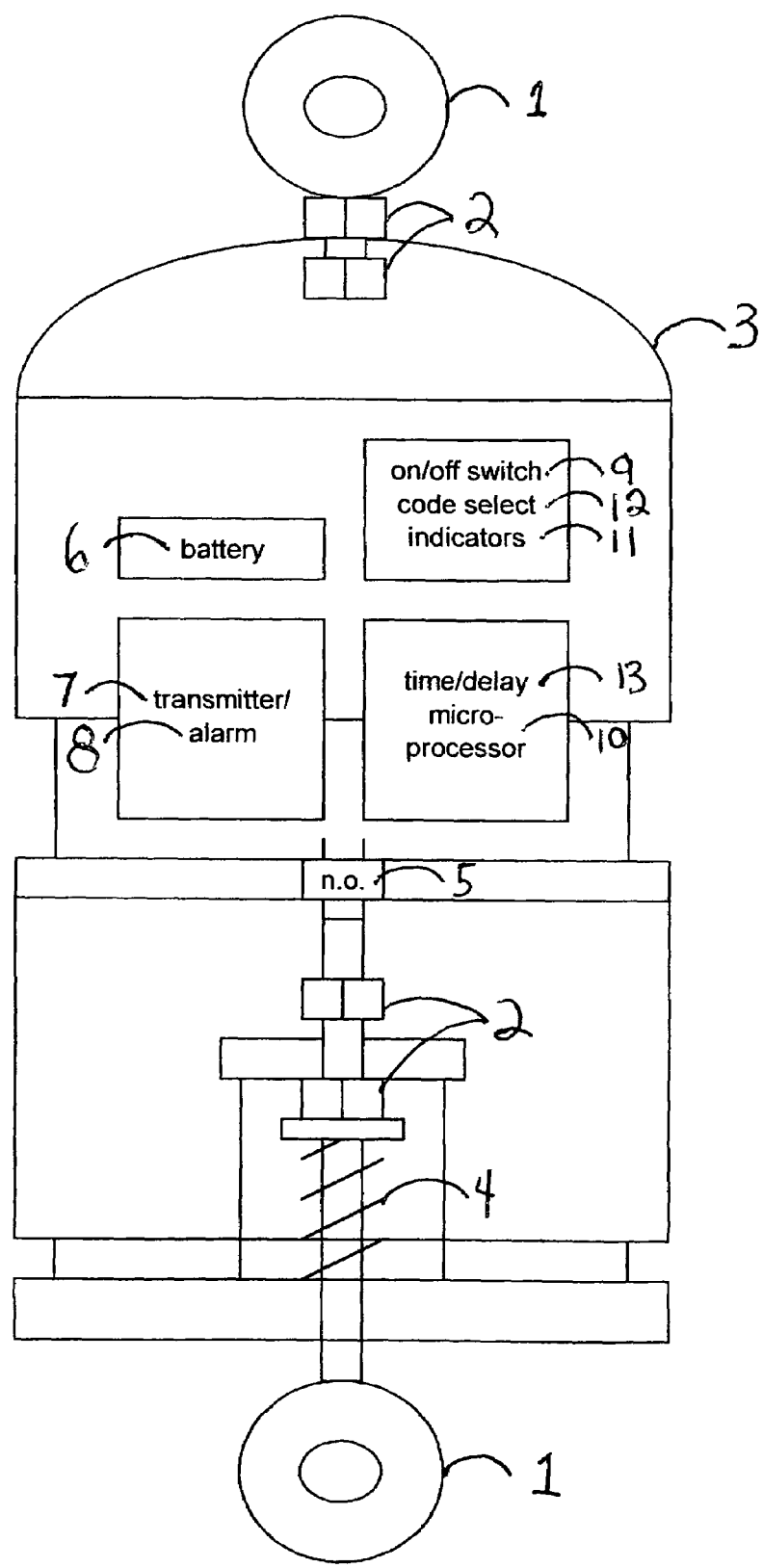
FIG. 1 is a block diagram of the basic elements of the Tie-Line-Attendant (TLA) as assembled in accordance with a preferred embodiment of this invention.

Preferred Embodiment—FIG. 1

Figure 4:
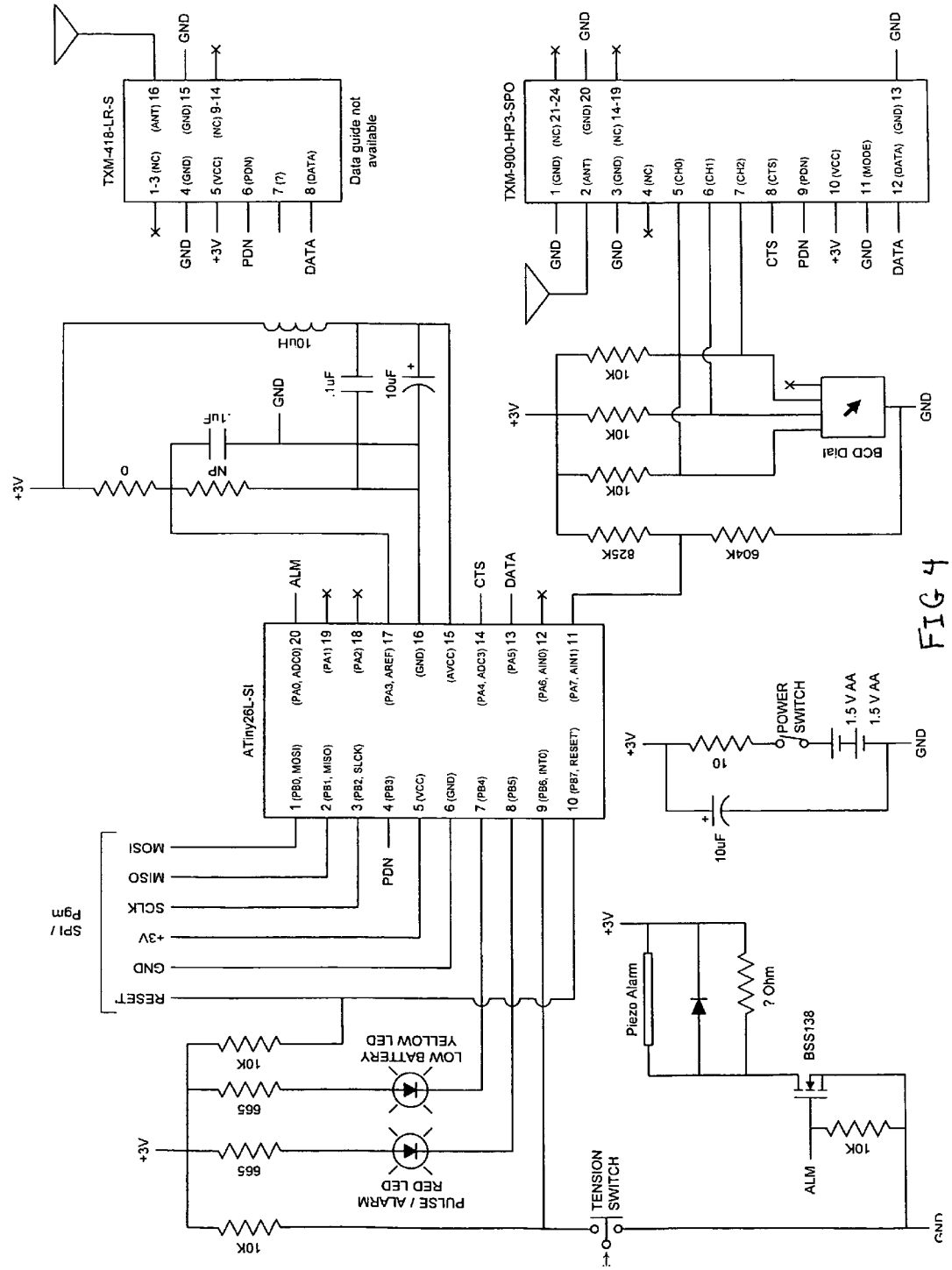
FIG. 4 and FIG. 5 are electric schematic diagrams of the Tie Line Transmitter.

A preferred embodiment of the Tie-Line-Attendant is illustrated in FIG. 1. FIG. 1 illustrates two eyelets 1 that are the attachment means for fastening the TLA to a substantial object and for attaching the horse to the TLA. Nuts 2 retain the eyelets to the housing 3. The housing 3 may be constructed of plastic, machined plastics and/or other forms of plastics. As pressure is exerted on the eyelets 1 the spring 4 is compressed allowing normally open contacts 5 to close, which allows a 3 volt electric current to flow through the circuitry as illustrated in FIG. 4. A microprocessor 10 will begin "counting" the time. Once the time reaches the amount of time set by the time/delay 13, an alarm 8 will sound and a signal is sent to the receiver.

Other components involved in this diagram include the power source 6 which is a configuration of at least one dc battery 6, a transmitter 7, an audible alarm 8, on/off switch 9 to power up the TLA and to turn on/off the audible alarm 8 and a microprocessor 10. The TLA will have LED indicators 11 which show information such as active alarm, radio link status, configuration parameters and battery conditions, a code select switch 12 to control functions like power on/off, configuration, and alarm deactivation, and a time delay 13. The time delay 13 and code select switch 12 are programmable by the operator.

Operation

Figure 2:
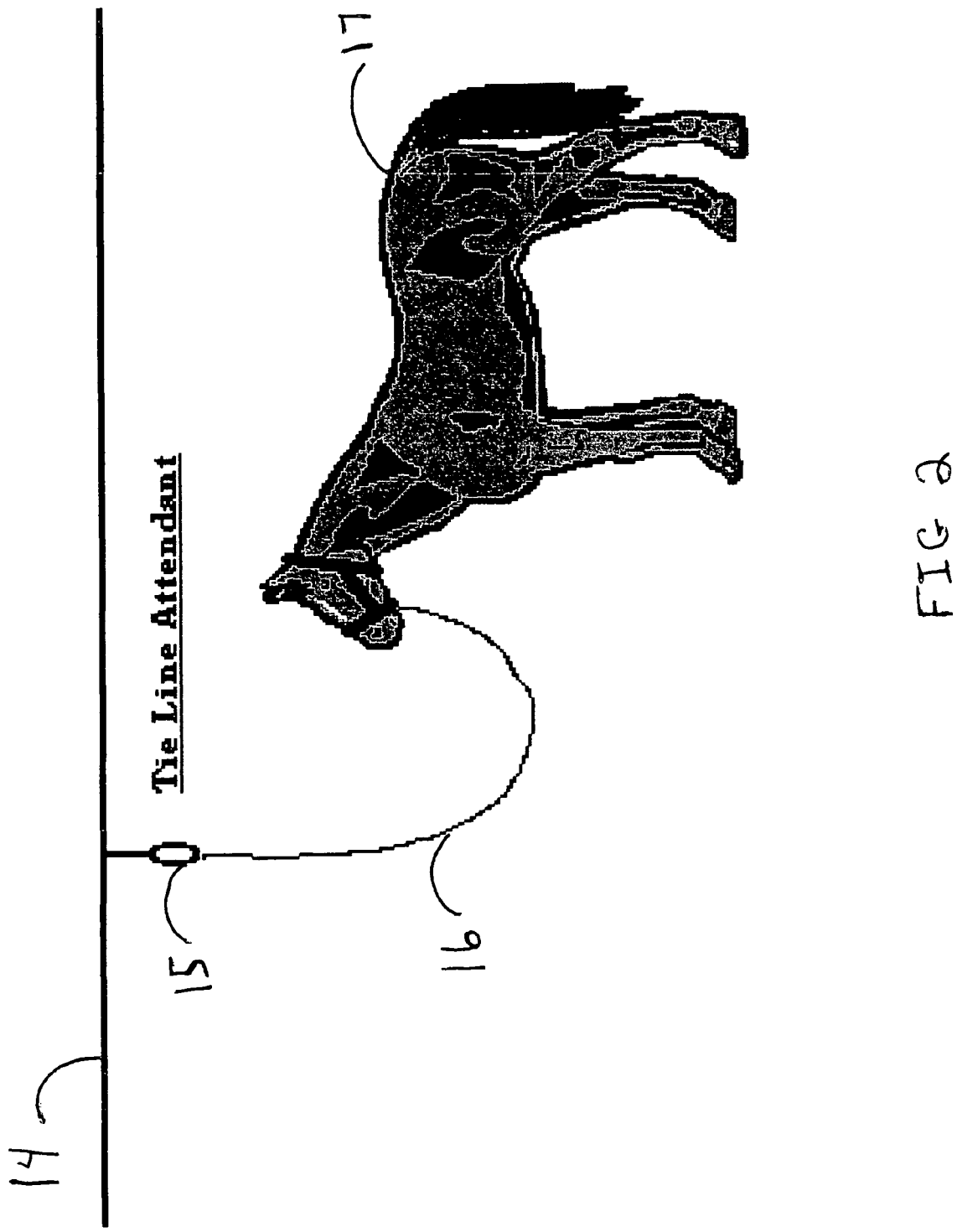
FIG. 2 is a diagram of the connection and interaction with one variety of animals.

Preferred Embodiment—FIG. 2

FIG. 2 illustrates how the TLA 15 is connected to a tie line 14 and the horse to be restrained is secured to the TLA with a tether line 16 which is attached to the horse 17.

Electronics and components—FIGS. 3, 4, 5, 6, 7, 8, 9, 10, 10a, and 11

Figure 3:
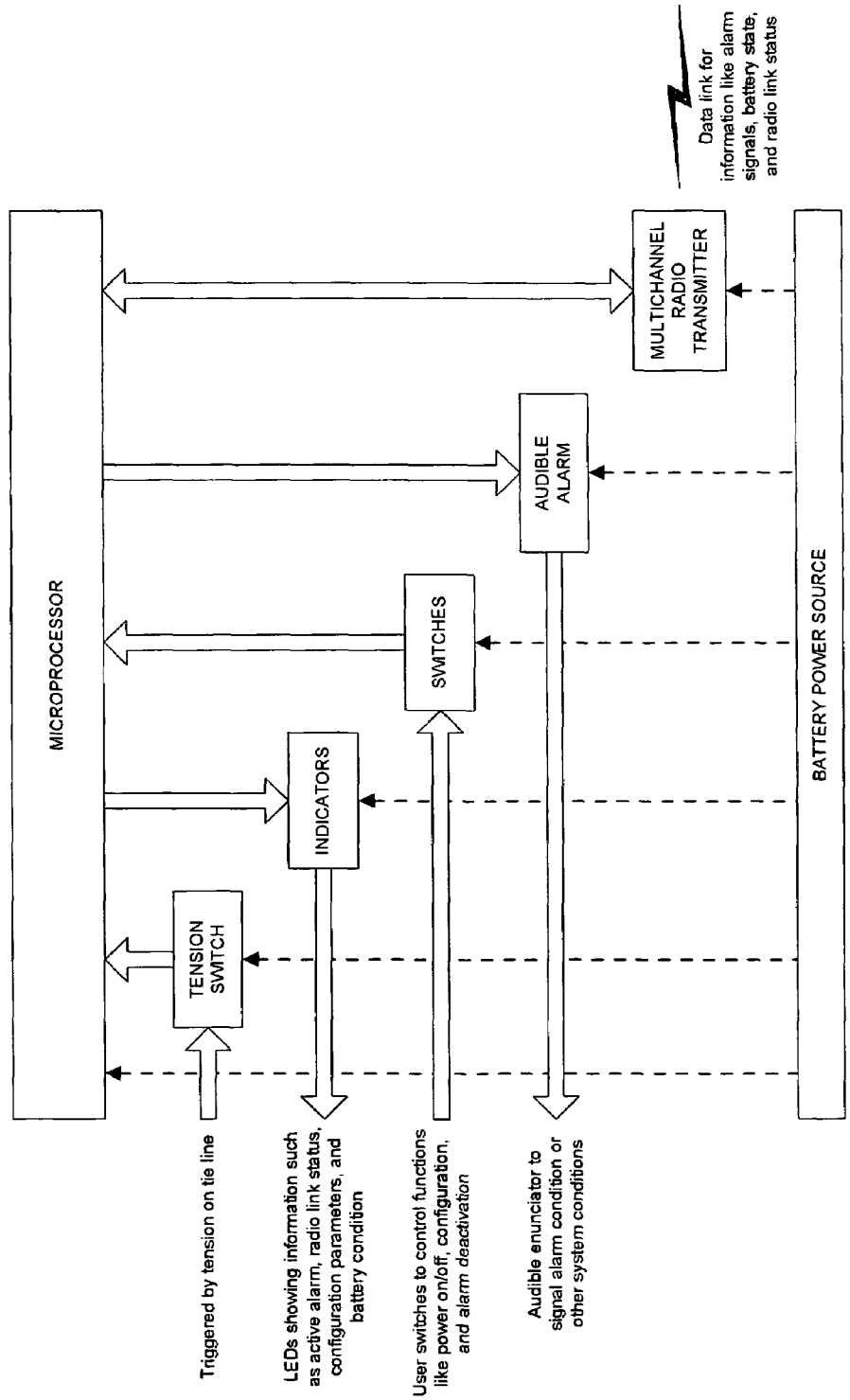
FIG. 3 is a block diagram of the transmitter and its components.
Figure 5:
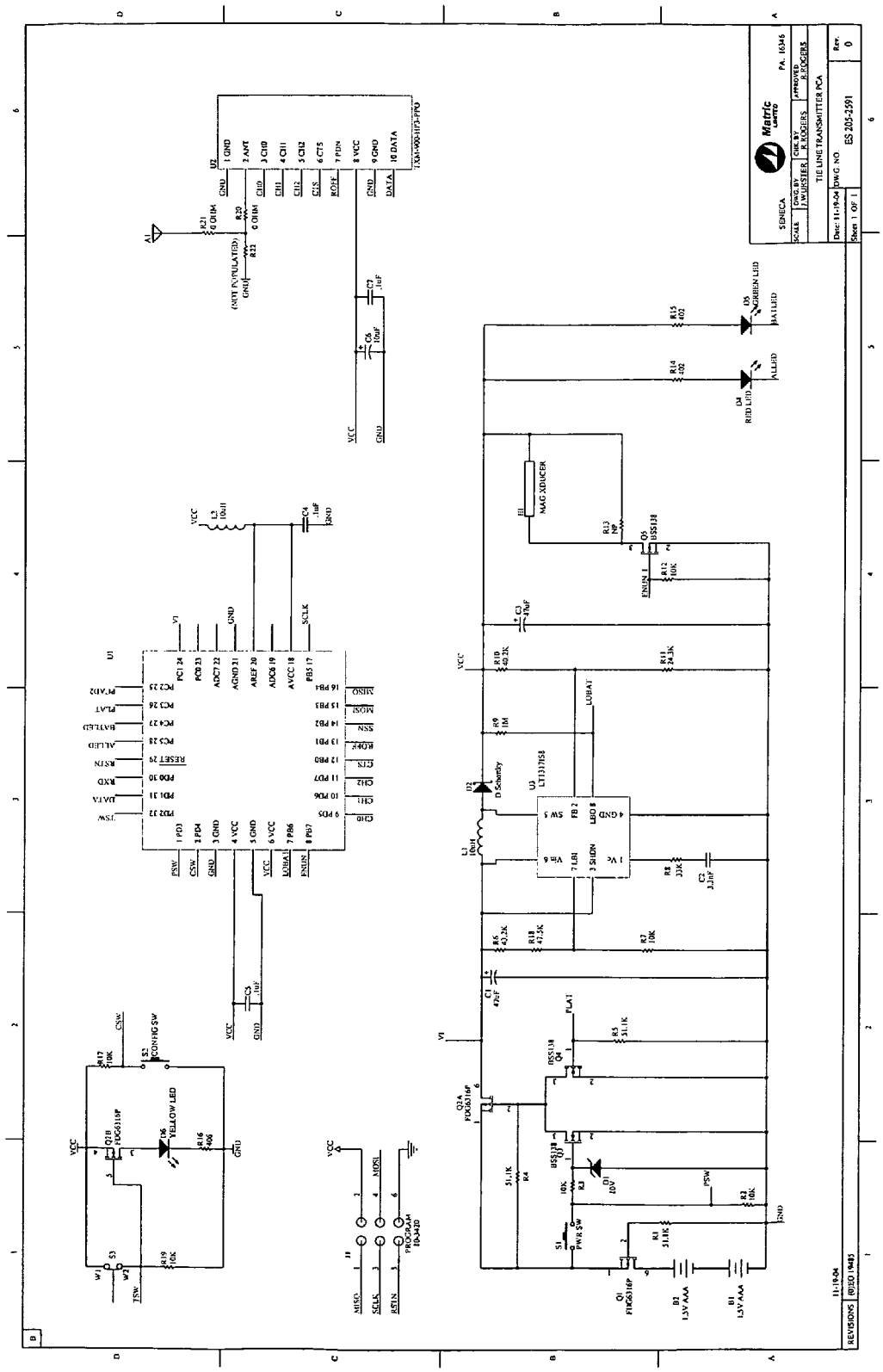
Figure 6:
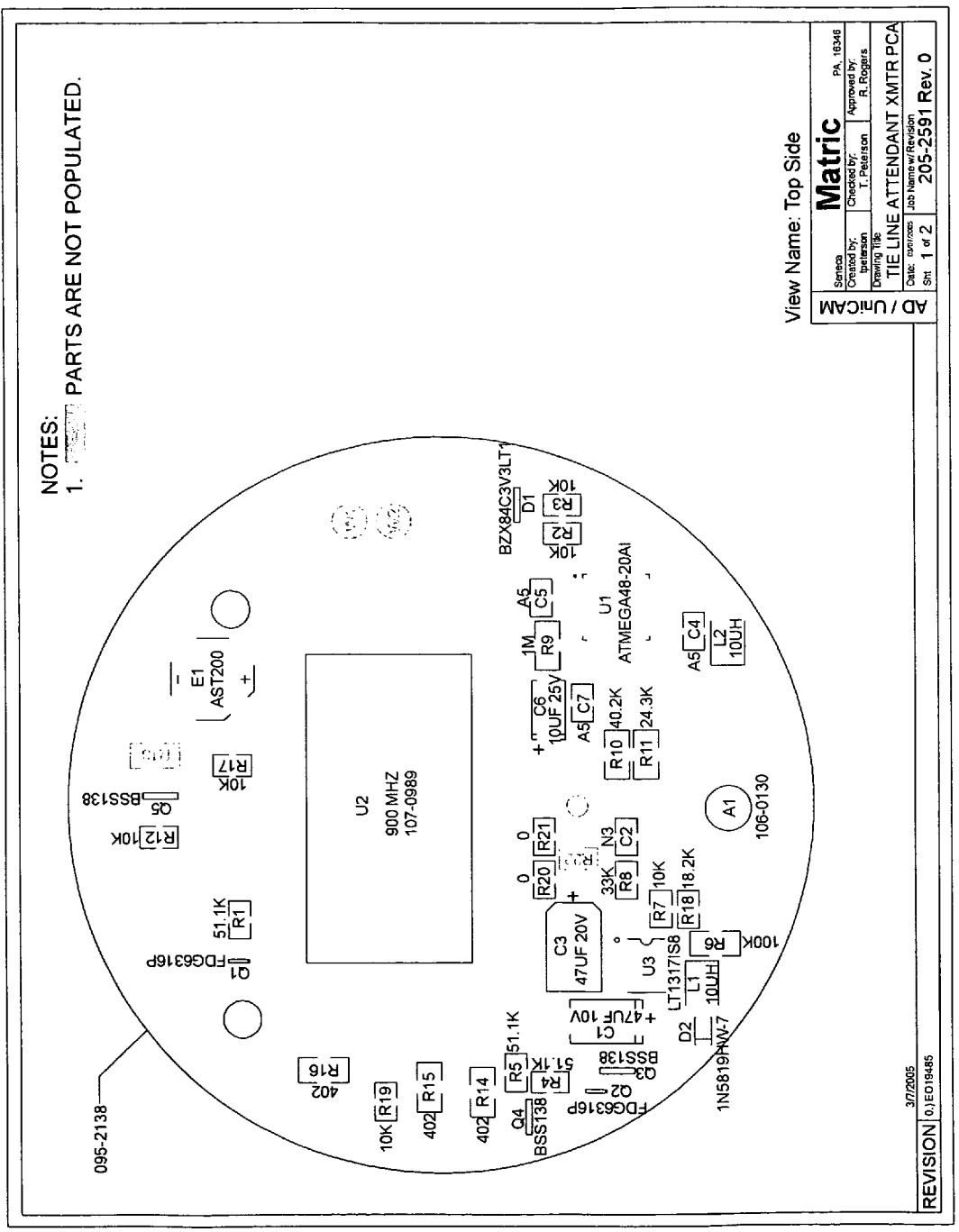
FIG. 6 and FIG. 6A are the top side view and bottom side view of the transmitter.
Figure 6A:
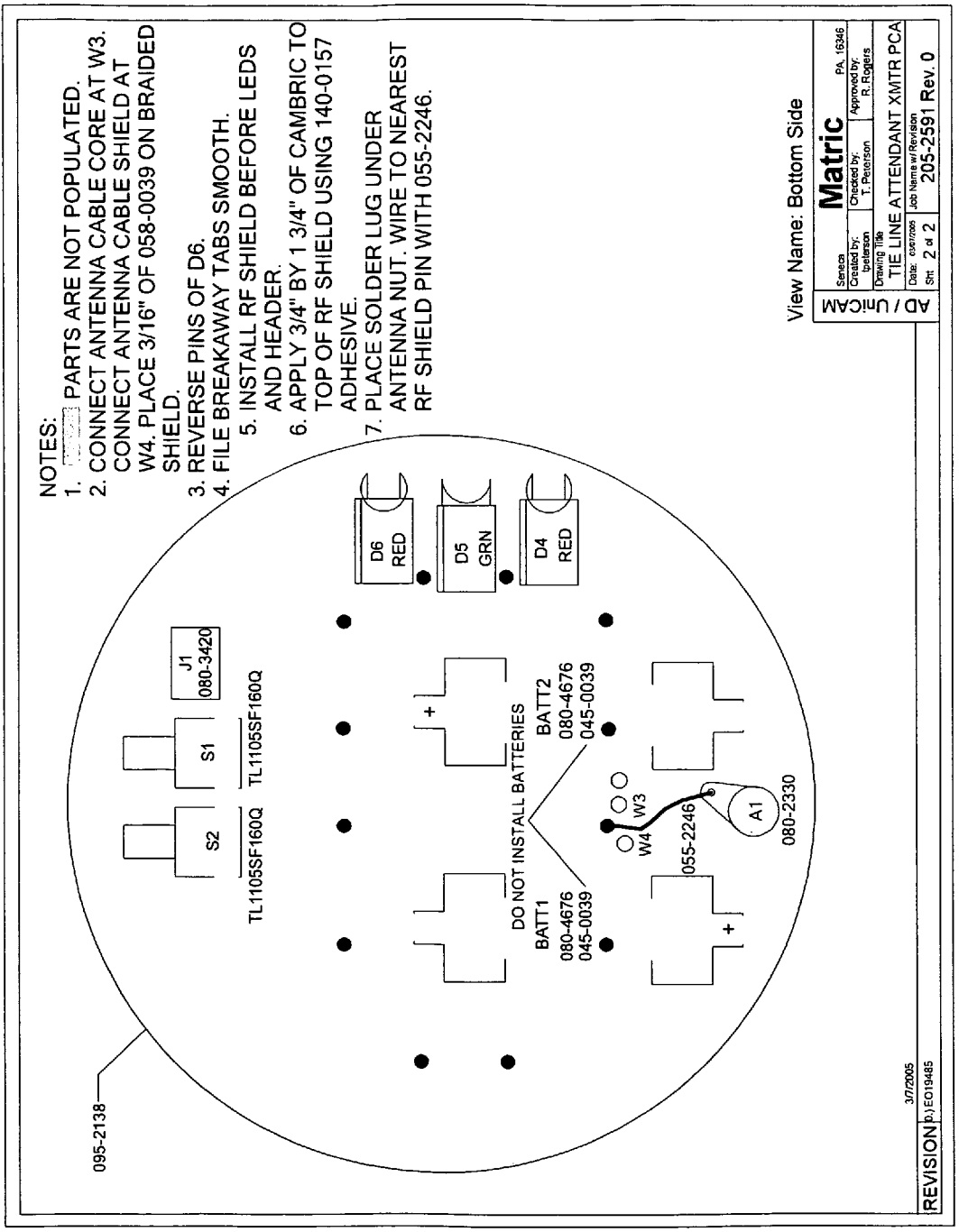
Figure 7:
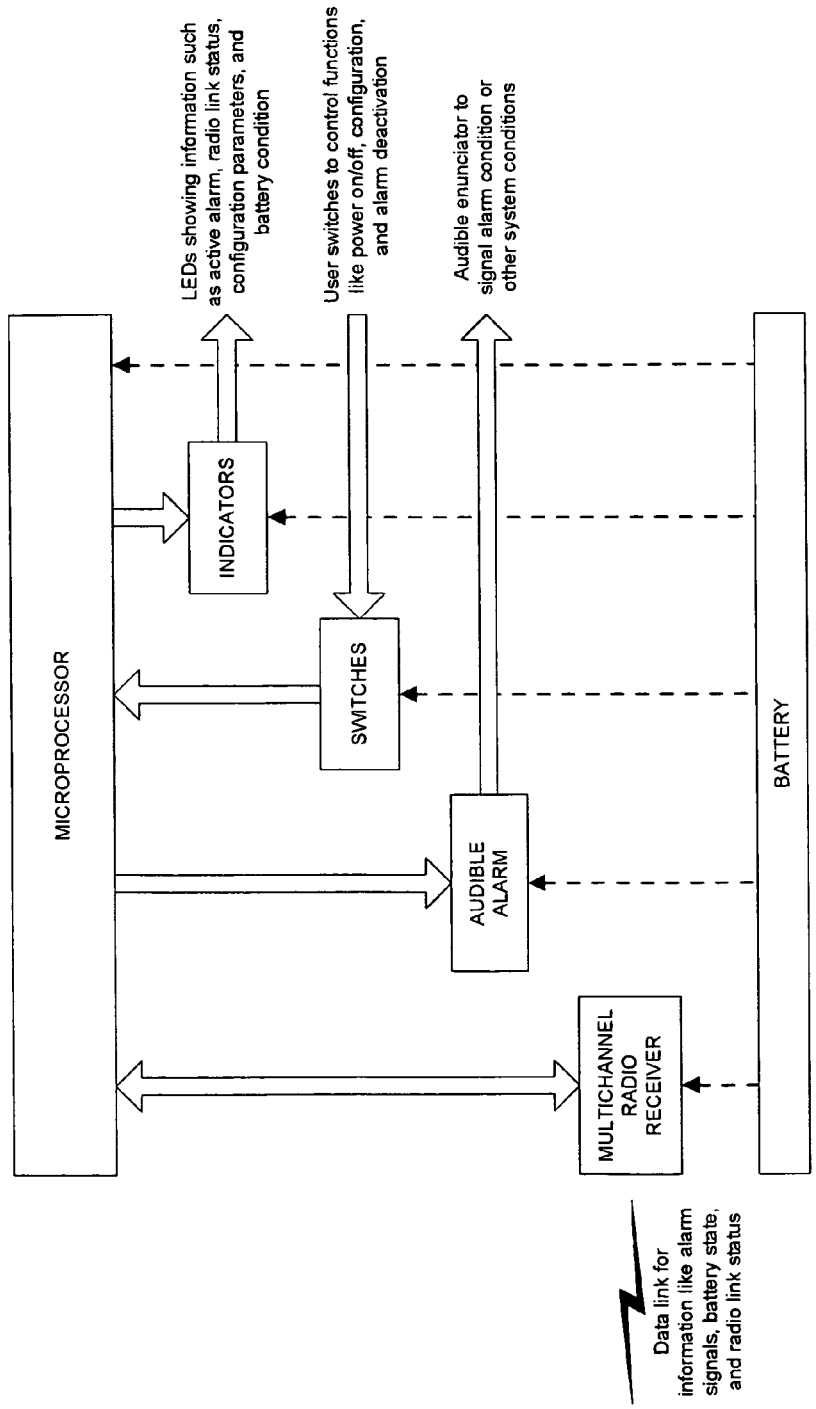
FIG. 7 is a block diagram of the TLA Receiver/Relay Unit and its components.
Figure 8:
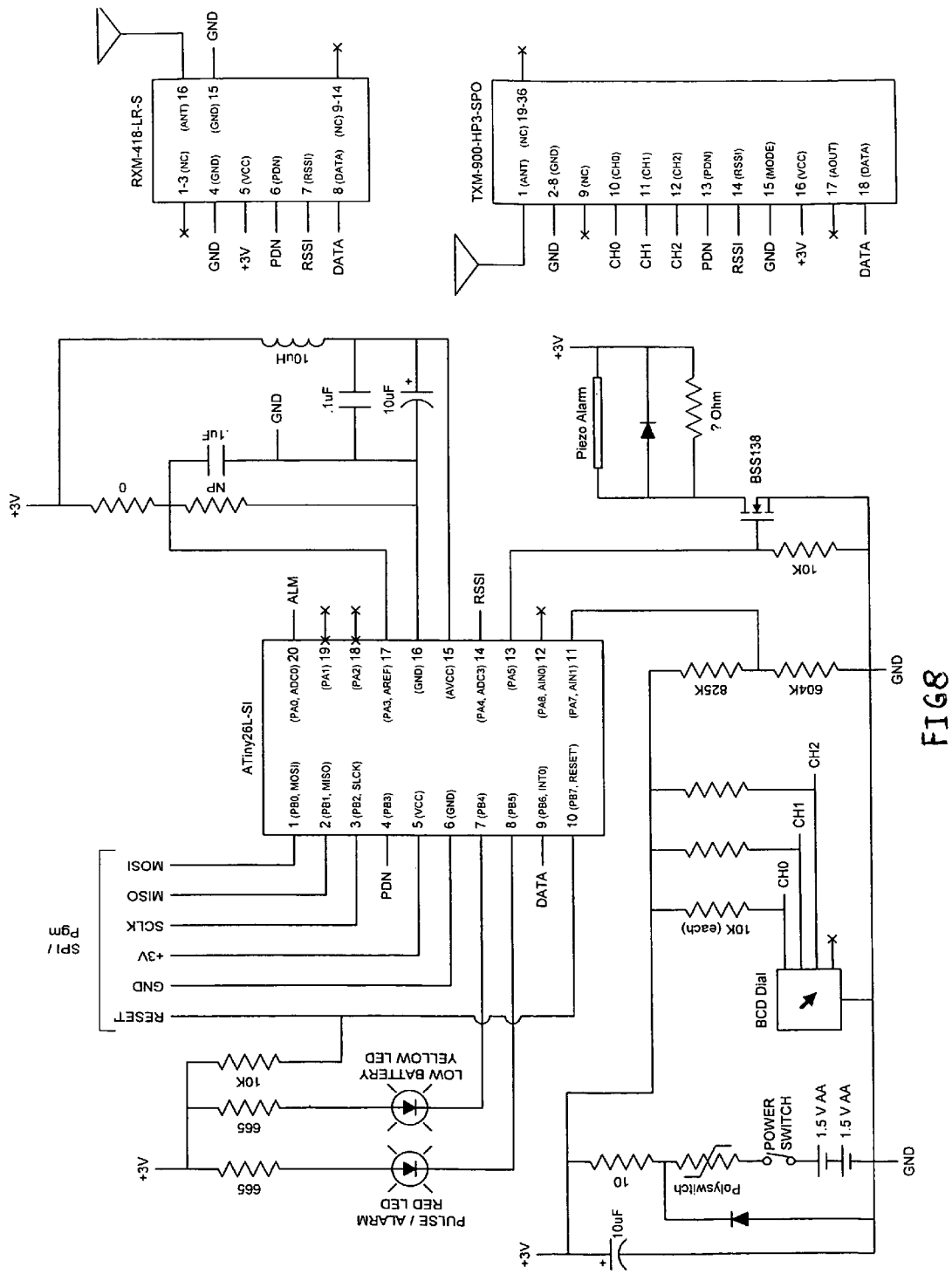
FIG. 8 and FIG. 9 are electric schematic diagrams of the Tie Line Receiver.
Figure 9:
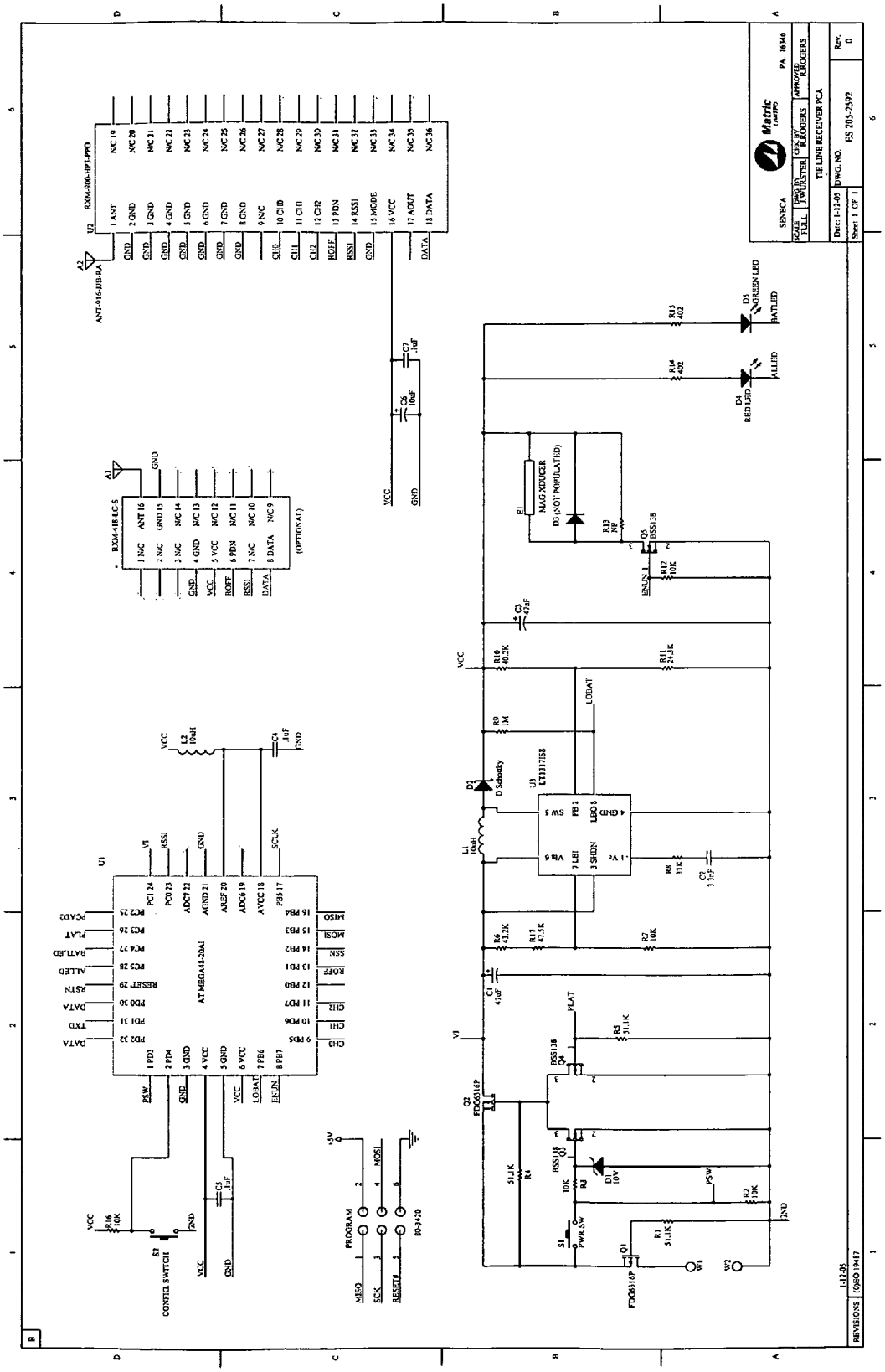
Figure 10:
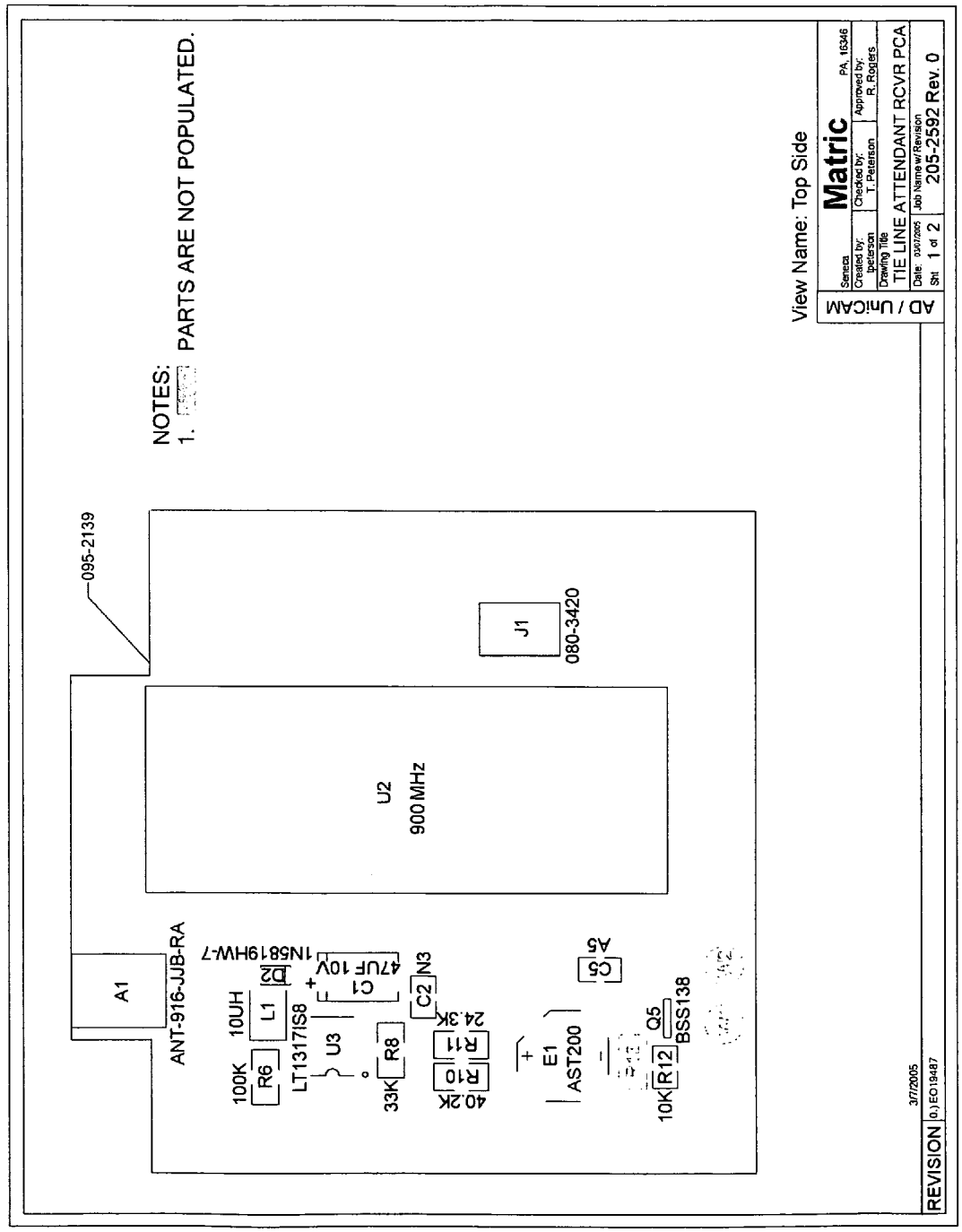
FIG. 10 and FIG. 10A are the top side view and bottom side view of the receiver.
Figure 10A:
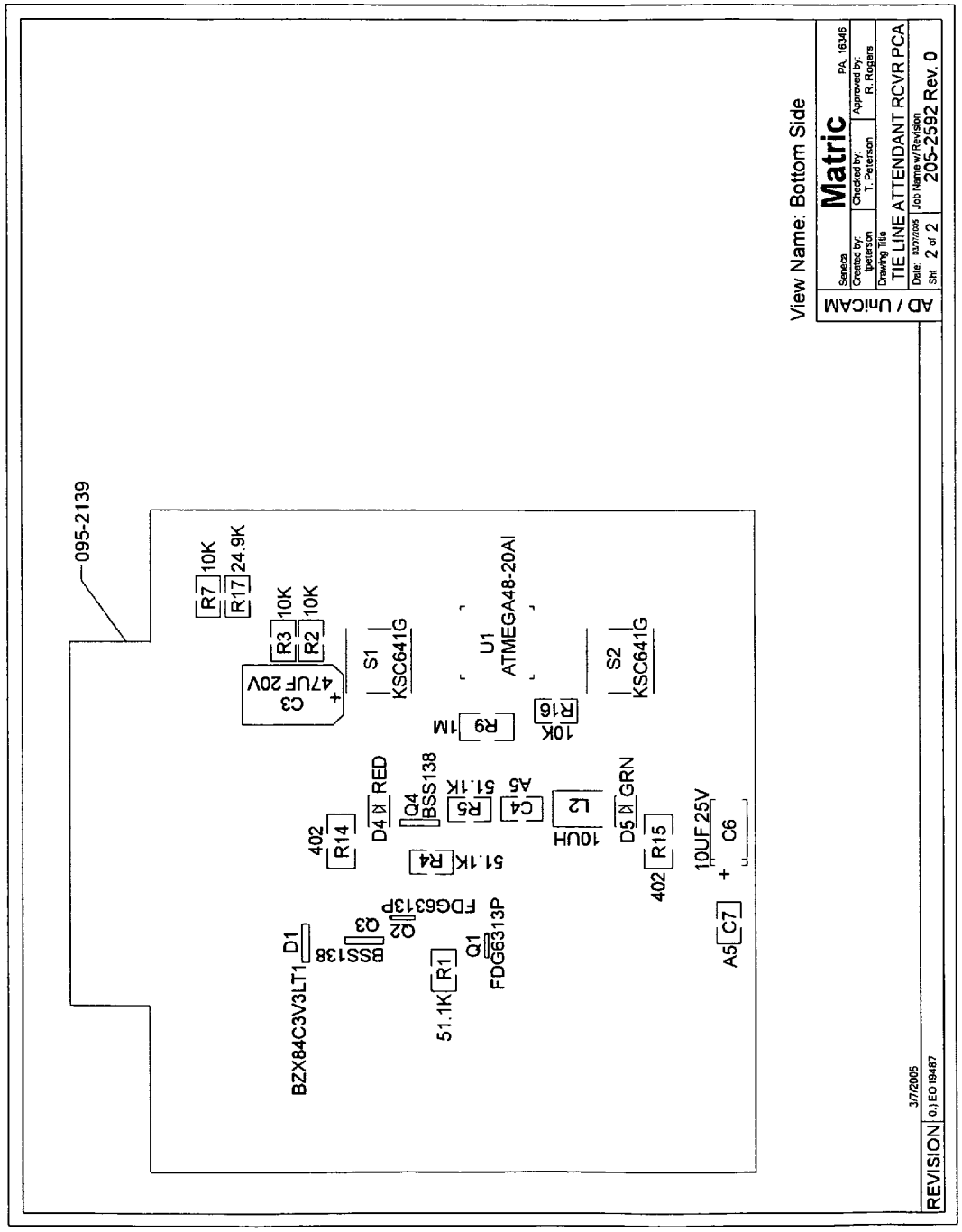
Figure 11:
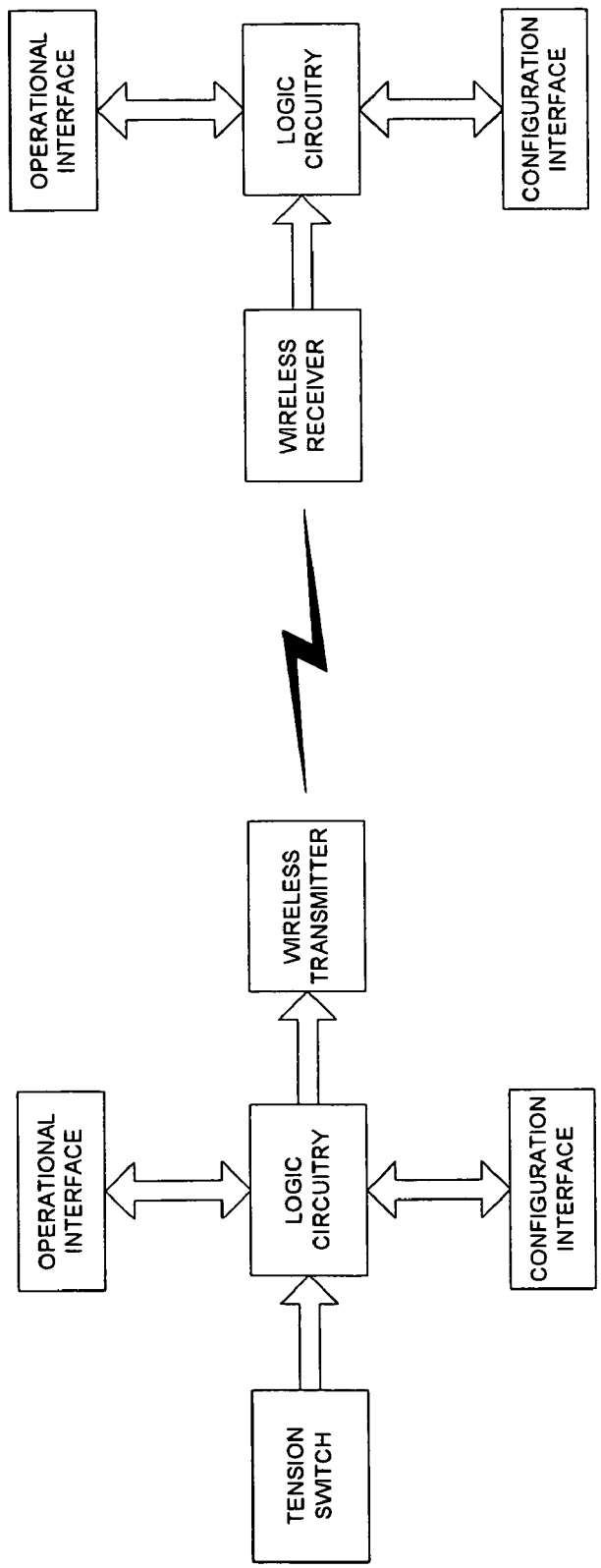
FIG. 11 is the system diagram of the transmitter and receiver of the Tie-Line-Attendant.

FIG. 3 illustrates the data flow from the components between the microprocessor and the battery power source of the Tie Line Transmitter. FIG. 4 and FIG. 5 illustrate the electronics of the transmitter. FIG. 6 and FIG. 6A illustrates the top side and bottom side view of the transmitter. FIG. 7 illustrates the data flow from the components between the microprocessor and the battery power source of the Tie Line Receiver. FIG. 8 and FIG. 9 illustrate the electronics of the receiver. FIG. 10 and FIG. 10A illustrates the top side and bottom side view of the receiver. FIG. 11 is the system diagram of the transmitter and receiver.

CONCLUSIONS, RAMIFICATIONS, AND SCOPE

Accordingly the reader will see that, the Tie-Line-Attendant provides horse owners with the comfort and peace of mind in knowing that he will be alerted if his horse becomes entangled while tied to a tether line. The Tie-Line-Attendant when used with other safety devices such as the "Break Away halter" will increase the security and safety of the horse. The TLA is durable, reliable and can be used with horses of all shapes and sizes.

While the above description contains many specificities, these should not be construed as limitations on the scope of the invention, but as exemplifications of the presently preferred embodiments thereof. Many other ramifications and variations are possible within the teachings of the invention.

Future options of the Tie-Line-Attendant includes but not limited to:

(a) A base unit that would release extra lines to relieve pressure until rescue is made and the horse is released by the person.

(b) A base unit that would release the horse, keeping it from fatal injuries and death.

(c) A base unit that can be installed on other surfaces such as picket fence, corridor, etc.

(d) A relay unit that would receive the alarming/sending unit signal and retransmit it to multiple receivers. The relay unit can be mounted on horse trailers, barns, vehicles, etc.

(e) A transmitter that could send a signal to a beeper, cell phone, etc.

Thus the scope of the invention should be determined by the appended claims and their legal equivalents, and not by the examples given.

The invention claimed is:

1. A safety device comprising of:
   (a) A transmitter which will:
     (1) Allow an owner to preset a time condition and frequencies on the transmitter for a specific horse;
     (2) Identify a horse in distress by measuring the time duration when pressure is applied to the transmitter and comparing it to its preset time conditions, thus activating an internal switch to transmit a signal to a remote and portable receiver;
     (3) Automatically resets itself when pressure is relieved from the device;
     (4) Contains a LED low-battery indicator to show when the transmitter needs a battery replacement;
     (5) Once the preset time condition is met, the transmitter will;
        1. Sound an alarm notifying the people nearby that a horse is in need of immediate assistance;
        2. Send a signal to the portable receiver, designed to operate in conjunction with and receive the signal from the transmitter to sound an audible alarm alerting that the horse needs immediate attention;
   (b) The portable receiver which will:
     (1) Allow an owner to set time and frequencies on the receiver for a specific horse;
     (2) Alert the owner when he the receiver is out of transmission range of the transmitter;
     (3) When a signal is received from the transmitter, the receiver will sound an alarm alerting the owner that his horse is in distress;
     (4) Contains a LED low-battery indicator to show when the receiver needs a battery replacement;
     (5) Allow the owner to manually reset the receiver once it has been activated.

* * * * *